No. 766,990. Patented August 9, 1904.

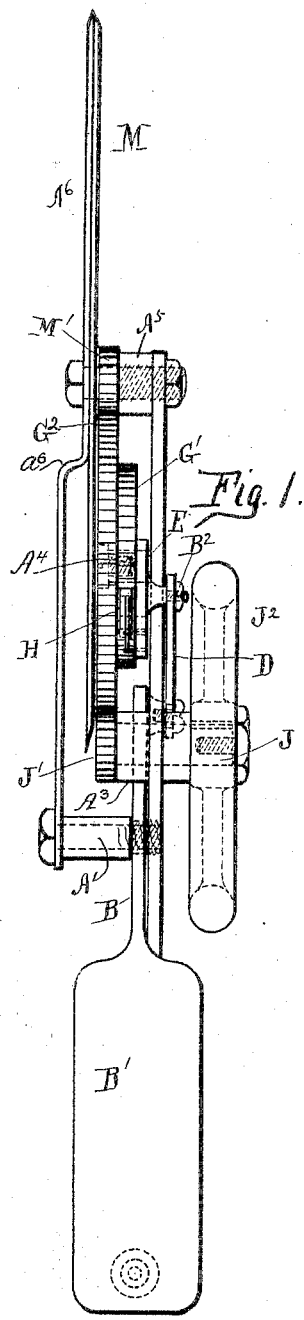
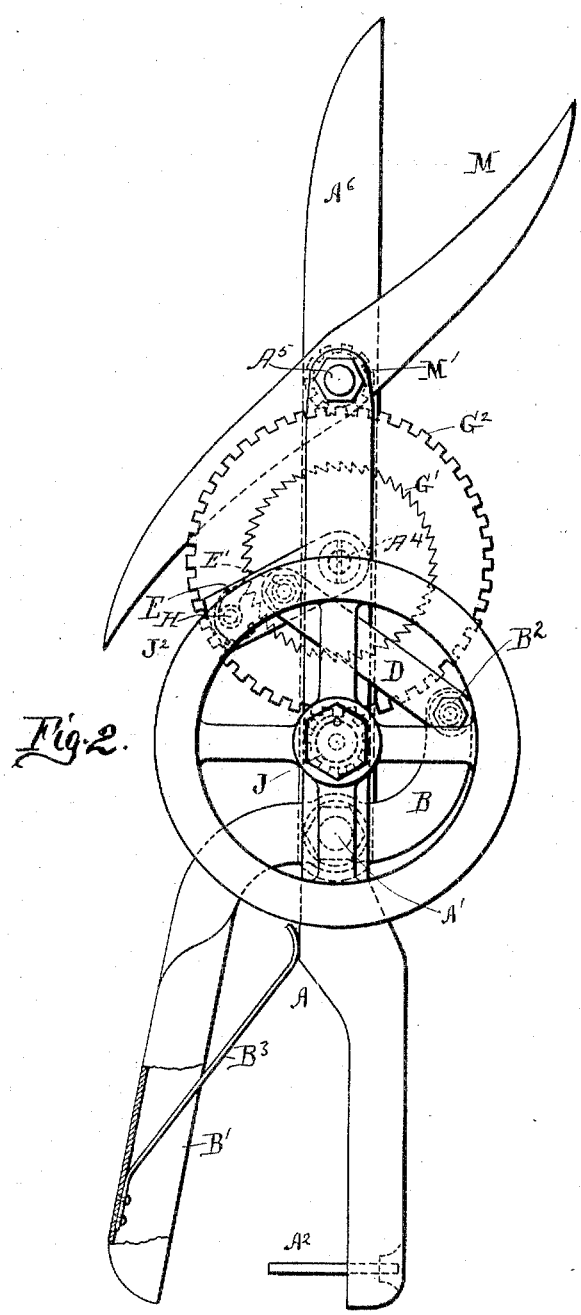

UNITED STATES PATENT OFFICE.

CHARLES M. CHANDLER, OF BAYONNE, NEW JERSEY.

CLIPPING-MACHINE.

SPECIFICATION forming part of Letters Patent No. 766,990, dated August 9, 1904.

Application filed February 4, 1904. Serial No. 191,920. (No model.)

*To all whom it may concern:*

Be it known that I, CHARLES M. CHANDLER, a citizen of the United States, residing at Bayonne, in the county of Hudson and State of New Jersey, have invented a certain new and useful Improvement in Clipping-Machines, of which the following is a specification.

I will describe the machine as adapted for trimming hedges and cutting the grass around trees and the like after the operation of the lawn-mower.

I effect the clipping by a revolving shaft carrying a cutter which serves with another cutter to clip by a shearing action. I impart motion by grasping and pressing together two handles. A single gear-wheel actuated by a ratchet from an operating-lever gives a rapid rotatory motion to the revolving blades and also through the medium of the same wheel treasures a surplus of dynamic effect in the form of momentum in a fly-wheel carried on the instrument. The opening and closing of the shears is repeated indefinitely by a succession of closings of the hand which supports the implement.

The following is a description of what I consider the best means of carrying out the invention.

The accompanying drawings form a part of this specification.

Figure 1 is an edge view showing a movable blade in the act of passing the stationary blade, and Fig. 2 is a face view showing the parts at a different stage of a revolution.

The figures show the machine or clipper in the upright position which may be assumed in clipping the sides of a hedge.

Letters of reference will designate different parts, supernumerals being added when necessary to indicate smaller divisions.

Similar marks of reference indicate like parts in both the figures where they appear.

A is the main body of a part which I will refer to as "stationary." Its lower portion forms a handle. It is provided with a pivot $A'$, a stop-pin $A^2$, a boss $A^3$, smoothly bored, as will presently appear, and two pivots $A^4$ and $A^5$. A lever B, having a handle $B'$, is connected thereto by the pivot $A'$ and is provided with an offset, eye, or boss at its upper end $B^2$ and subject to the force of a gentle spring $B^3$.

The pivot $A^4$, firmly set in the body A, serves as a stud on which two rigidly-united wheels—a ratchet-wheel $G'$, and a gear-wheel $G^2$—turn and also as a center on which a lever E is caused to vibrate, by means of a link D, which connects the eye $B^2$ with a pivot $E'$ near the mid-length of E. A pawl H, carried by this lever, causes its vibrations to vigorously actuate the wheels $G'$ $G^2$ with each closing motion of the handles.

M is a double-ended revolving shear-blade, and $M'$ is a pinion fixed on one face at the mid-length thereof, engaged by the gear-wheel $G^2$ and rapidly rotated thereby. This blade M, coacting with the fixed shear-blade $A^6$, the latter extending outward beyond $A^5$ and having an offset at $a^6$, effects the shearing desired by rapid and clean cuts, according as the clipper is presented to the work.

The part $A'$ performs the two functions of serving as a pivot for the lever B and holding the inner end of the fixed shear-blade $A^6$. The pivot $A^5$, firmly set in the outer end of A, performs the two functions of a bolt for holding the fixed shear-blade $A^6$ and a smooth stud on which the revolving shear-blade M and its pinion $M'$ can freely turn. The bored boss $A^3$ forms the bearing for a short shaft J, which has at one end a pinion $J'$, engaging with the gear-wheel $G^2$, and at the other end a fly $J^2$.

The operation is effected by alternately closing and opening the hand. One hand may serve alone. The cutting is effected at the passage of either blade of the revolving part M past the stationary part. In some work it may be revolved idly a few times at intervals to acquire a higher rotative velocity.

I attach importance to the fact that the revolving shear M is two-bladed because the two parts balance each other; that the part $A^6$ is formed separately from the other fixed parts and rigidly united thereto, because it makes a strong self-contained device with facility for assembling and separating, and that the fly-wheel $J^2$, geared to turn at a high velocity, is near the handle, because its weight is more easily supported.

I attach importance to the construction of the part $A^6$ with an offset $a^6$ because it allows the revolving shear M to be plane and presents the fixed shear-blade adjacent to the plane thereof while it is in the effective part of its revolution and provides ample clearance while it is in the ineffective portion.

Modifications may be made without departing from the principle or sacrificing the advantages of the invention. I have in my experiments made the parts of sheet-steel, with the thick portions welded or brazed thereon. I propose to make some of the parts drop-forgings or malleable castings.

I claim as my invention—

A clipping-machine comprising a portable frame with handles, a pivoted shear-blade and mechanism for revolving it continuously by intermittently pressing the handles together, in combination with each other and with a fly $J^2$ mounted nearer the handles, and with a fixed shear-blade $A^6$ formed with an offset $a^6$ and rigidly secured to serve as a unit with other portions of the frame, all substantially as herein specified.

In testimony that I claim the invention above set forth I affix my signature in presence of two witnesses.

CHARLES M. CHANDLER.

Witnesses:
B. F. AWTRY,
M. F. BOYLE.